United States Patent
Yamane et al.

(10) Patent No.: US 7,231,389 B2
(45) Date of Patent: Jun. 12, 2007

(54) MUSIC SEARCH DEVICE

(75) Inventors: Hiroaki Yamane, Kadoma (JP); Junichi Tagawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 463 days.

(21) Appl. No.: 10/852,617

(22) Filed: May 25, 2004

(65) Prior Publication Data

US 2004/0267736 A1 Dec. 30, 2004

(30) Foreign Application Priority Data

May 26, 2003 (JP) ............................. 2003-148112

(51) Int. Cl.
*G06F 7/00* (2006.01)
*G06F 17/00* (2006.01)

(52) U.S. Cl. ............................................ 707/5; 700/94
(58) Field of Classification Search ............... 707/3–10; 700/90, 94
See application file for complete search history.

(56) References Cited

U.S. PATENT DOCUMENTS

2001/0010663 A1* 8/2001 Nakazawa et al. ............. 369/2
2002/0130898 A1* 9/2002 Ogawa et al. ............... 345/727
2003/0045954 A1* 3/2003 Weare et al. .................. 700/94

FOREIGN PATENT DOCUMENTS

JP 2002-278547 9/2002

* cited by examiner

*Primary Examiner*—Wilson Lee
(74) *Attorney, Agent, or Firm*—Wenderoth, Lind & Ponack, L.L.P.

(57) ABSTRACT

The present invention provides a music search device for searching for a tune by using an impression quantity obtained by quantifying a listener's impression of such a tune. A tune database contains at least data of a plurality of tunes and a characteristic quantity obtained by quantifying characteristics of each tune. The tune database includes an adjustment table. A reference table storage section stores a reference table containing a previously obtained set of a characteristic quantity and an impression quantity for each of a plurality of sample tunes. When an adjustment input is received, an updating section adds to the adjustment table a set of a received impression quantity and a characteristic quantity of a tune associated with the received impression quantity, and updates the mapping function based on the adjustment table, to which the set of the impression quantity and the characteristic quantity has been added, and the reference table.

16 Claims, 12 Drawing Sheets

FIG. 3A

| EVALUATED TUNE NUMBER | CHARACTERISTIC QUANTITY | | | TUNE WEIGHT |
|---|---|---|---|---|
| | TEMPO | BEAT | ... | |
| 1 | 103 | 16 | ... | 0.79 |
| 2 | 79 | 8 | ... | 0.65 |
| ⋮ | ⋮ | ⋮ | | ⋮ |

FIG. 3B

FIRST IMPRESSION VALUE TABLE

| EVALUATOR NUMBER | 1 | | |
|---|---|---|---|
| DATA WEIGHT | 1.23 | | |

| EVALUATED TUNE NUMBER | FIRST IMPRESSION VALUE | | |
|---|---|---|---|
| | VIOLENT-NESS | REFRESHING-NESS | ... |
| 1 | 4 | 3 | ... |
| 2 | 1 | 5 | ... |
| ⋮ | ⋮ | ⋮ | |

| EVALUATOR NUMBER | 2 | | |
|---|---|---|---|
| DATA WEIGHT | 0.86 | | |

| EVALUATED TUNE NUMBER | FIRST IMPRESSION VALUE | | |
|---|---|---|---|
| | VIOLENT-NESS | REFRESHING-NESS | ... |
| 1 | 5 | 5 | ... |
| 2 | 2 | 3 | ... |
| ⋮ | ⋮ | ⋮ | |

⋮

EVALUATION DATA

FIG. 4

| TUNE NUMBER | MUSIC DATA | RELATED INFORMATION | CHARACTERISTIC QUANTITY | | | EVALUATION FLAG | FIRST IMPRESSION VALUE | | | TUNE WEIGHT |
|---|---|---|---|---|---|---|---|---|---|---|
| | | | TEMPO | BEAT | ... | | VIOLENT-NESS | REFRESHING-NESS | ... | |
| 1 | SS1.wav | ×× | 134 | 16 | ... | 0 | | | ... | 0 |
| 2 | SS2.mp3 | ○○ | 97 | 16 | ... | 1 | 4 | 4 | ... | 1.37 |
| ... | ... | ... | ... | ... | | ... | | | | ... |

FIG. 6

| MAPPING FUNCTION DATA NUMBER | CHARACTERISTIC QUANTITY | | | FIRST IMPRESSION VALUE | | | TUNE WEIGHT |
|---|---|---|---|---|---|---|---|
| | TEMPO | BEAT | ... | VIOLENT-NESS | REFRESHING-NESS | ... | |
| 1 | 114 | 16 | ... | 4 | 6 | ... | 0.89 |
| 2 | 142 | 8 | ... | 7 | 1 | ... | 1.20 |
| ... | ... | ... | | ... | ... | | ... |

| PRESET WORD | FIRST IMPRESSION VALUE | | |
|---|---|---|---|
| | VIOLENT-NESS | REFRESHING-NESS | ... |
| CHEERFUL | 5 | 7 | ... |
| HEARTBREAKING | 2 | 4 | ... |
| ⋮ | ⋮ | ⋮ | |

MUSIC SEARCH DEVICE

BACKGROUND OF THE INVENTION

1. Field of the Invention

The present invention relates to a music search device, and more particularly to a music search device for searching for music data based on a user's subjective evaluation.

2. Description of the Background Art

In recent years, with the availability of personal computers, or the like, having a large-capacity storage device and with the advancements in the music data compression technology, a large number of music tunes (a large amount of music data) can be stored in a personal computer. Where a user can store a large number of tunes, it would be convenient for the user to be able to identify a tune of interest from among a large number of tunes by specifying an image that the user has for such a tune, as well as by specifying its title.

Music search methods for searching for a tune according to the user's impression of such a tune have been proposed in the art. In these methods, a musical characteristic quantity (such as tempo or beat) of a tune is automatically extracted from the tune data and converted into an impression quantity (such as violent-ness or refreshing-ness), which is obtained by quantifying the impression of the tune. The user, searching for a tune, inputs an impression quantity, and a tune having an impression quantity close to the inputted impression quantity is presented to the user. Thus, the user can easily find a tune of a certain image intended by the user.

The conversion between the characteristic quantity and the impression quantity can be performed by using a mapping function. The mapping function is derived from combinations of impression quantities obtained by actually evaluating various tunes, and characteristic quantities uniquely derived from the tunes. More specifically, the impression quantity and the characteristic quantity are obtained for each of a plurality of tunes, and a mapping function is derived from the obtained combinations so that the impression quantity and the characteristic quantity can be properly converted to each other by the mapping function for those tunes. Using the derived mapping function, the impression quantity of a tune that has not been actually evaluated can be calculated.

However, each person has a different perception from others. Therefore, a particular mapping function cannot produce conversion results that agree with the perceptions of all users. Moreover, people have to actually evaluate a number of tunes to obtain a mapping function. If the number of tunes evaluated or the number of people evaluating tunes is not sufficient, it may not be possible to obtain a desirable mapping function (i.e., a mapping function capable of producing conversion results that agree with the perceptions of many users). Therefore, with the conventional music search methods, the tune presented to the user in response to an impression quantity inputted by the user may not be a tune of the image intended by the user.

Moreover, with the conventional methods, the mapping function for the conversion between the characteristic quantity and the impression quantity is a predetermined fixed function. Therefore, even if the search results do not agree with the perception of the user, the user cannot make adjustments to the function. An ideal mapping function for a certain user may be obtained if the user actually evaluates a large number of tunes, but it will be quite time-consuming and tiring for the user. It is quite impractical that each user has to evaluate a large number of tunes to obtain a mapping function that suits the user. As described above, with the conventional music search methods, the search results may not agree with the perception of the user. Moreover, in such a case, the user is left with no option at all for improving the search function.

SUMMARY OF THE INVENTION

Therefore, an object of the present invention is to provide a music search device which is capable of producing search results that agree with the perception of the user.

The present invention has the following features to attain the object mentioned above. The present invention provides a music search device for searching for a tune by using an impression quantity obtained by quantifying the listener's impression of such a tune. The music search device includes a tune data storage section, a reference table storage section, an adjustment table storage section, a mapping function storage section, an adjustment receiving section, an updating section and a search section. The tune data storage section stores at least data of a plurality of tunes and a characteristic quantity for each tune obtained by quantifying characteristics of the tune. The reference table storage section stores a reference table containing a previously obtained set of a characteristic quantity and an impression quantity for each of a plurality of sample tunes. The adjustment table storage section stores an adjustment table containing a set of a characteristic quantity and an impression quantity for a tune stored in the tune data storage section. The mapping function storage section stores a mapping function that is derived based on the reference table and the adjustment table. The adjustment receiving section receives an input from the user specifying an impression quantity for a tune stored in the tune data storage section as a mapping function adjustment input. When an adjustment input is received by the adjustment receiving section, the updating section adds to the adjustment table a set of a received impression quantity and a characteristic quantity of a tune associated with the received impression quantity, and updates the mapping function based on the adjustment table, to which the set of the impression quantity and the characteristic quantity has been added, and the reference table. The search section receives an input from the user specifying an impression quantity as a tune data search instruction to search for tune data stored in the tune data storage section by using the received impression quantity and the mapping function updated by the updating section.

The impression quantity may be represented as a first impression value, which is a multidimensional vector, or a second impression value, which is a lower-dimensional vector than the first impression value. In such a case, the mapping function converts a characteristic quantity to a second impression value. The reference table and the adjustment table contain second impression values as impression quantities. The adjustment receiving section receives an input specifying a first impression value as an impression quantity, and converts the received first impression value to a second impression value. The updating section adds to the adjustment table a set of the second impression value converted by the adjustment receiving section and a characteristic quantity of a tune associated with the second impression value.

The search section may include a search data generation section and a second impression value receiving section. In such a case, the search data generation section calculates a second impression value by using the mapping function updated by the updating section for each tune stored in the tune data storage section to generate search data in which each tune is associated with the calculated second impression value. The second impression value receiving section receives an input specifying a second impression value as an impression quantity to search for a tune by using the received second impression value and the search data.

The search section may include a search data generation section and a first impression value receiving section. In such a case, the search data generation section calculates a second impression value by using the mapping function updated by the updating section for each tune stored in the tune data storage section, and converts the calculated second impression value to a first impression value to generate search data in which each tune is associated with the converted first impression value. The second impression value receiving section receives an input specifying a first impression value as an impression quantity to search for a tune by using the received first impression value and the search data.

The reference table may further contain a tune weight in addition to a characteristic quantity and an impression quantity associated with each of a plurality of sample tunes. In such a case, the updating section includes an impression quantity updating section, a mapping function updating section and a tune weight updating section. When an adjustment input is received by the adjustment receiving section, the impression quantity updating section adds to the adjustment table a set of a received impression quantity, a predetermined tune weight value, and a characteristic quantity of a tune associated with the received impression quantity. The mapping function updating section updates the mapping function based on the adjustment table, to which the set of the impression quantity and the characteristic quantity has been added by the impression quantity updating section, and the reference table. The tune weight updating section updates the tune weight contained in the reference table.

The reference table storage section may store a plurality of types of reference tables as pieces of evaluation data, with a data weight being associated with each piece of the evaluation data. In such a case, the updating section includes an impression quantity updating section, a mapping function updating section and a data weight updating section. When an adjustment input is received by the adjustment receiving section, the impression quantity updating section derives a single reference table based on the reference tables and the data weight, and adds to the single reference table a set of a received impression quantity and a characteristic quantity of a tune associated with the received impression quantity. The mapping function updating section updates the mapping function based on the adjustment table, to which the set of the impression quantity and the characteristic quantity has been added by the impression quantity updating section, and the reference table. The data weight updating section updates the data weight stored in the reference table storage section.

The music search device may further include: a selection input receiving section for receiving a selection input specifying one of the tunes stored in the tune data storage section; and a reproduction section for, when a selection input is received by the selection input receiving section, reproducing the tune specified by the selection input. In such a case, the adjustment receiving section receives an input from the user specifying an impression quantity for the tune being reproduced by the reproduction section.

The music search device may further include an impression quantity presentation section. When a selection input is received by the selection input receiving section, the impression quantity presentation section presents to the user an impression quantity that is obtained by using the mapping function, from a characteristic quantity stored in the tune data storage section for the tune specified by the selection input.

The music search device may further include a preset word table storage section and a preset word presentation section. The preset word table storage section stores a preset word table in which a plurality of preset words, each representing a listener's impression of a tune, are each associated with an impression quantity of the tune. When a selection input is received by the selection input receiving section, the preset word presentation section presents to the user one of the preset words contained in the preset word table that is associated with an impression quantity closest to the impression quantity presented by the impression quantity presentation section.

The music search device may further include a preset word display section, a preset word receiving section and an impression quantity conversion section. The preset word display section displays at least one preset word stored in the preset word table. The preset word receiving section receives an input from the user specifying one of the at least one preset word displayed by the preset word display section. The impression quantity conversion section converts the preset word received by the preset word receiving section to an impression quantity by using the preset word table. In such a case, the adjustment receiving section receives the impression quantity converted by the impression quantity conversion section as the mapping function adjustment input.

The impression quantity values contained in the preset word table may be adjusted by the user.

The characteristic quantity stored in the tune data storage section may include a value representing a tempo of a tune. In such a case, the music search device further includes a tempo input receiving section and a tempo updating section. The tempo input receiving section receives an input from the user specifying a tempo value for a tune stored in the tune data storage section. The tempo updating section updates the tempo value stored in the tune data storage section based on the tempo value received by the tempo input receiving section.

The tempo updating section may use, as an adjusted tempo value, either the tempo value as stored in the tune data storage section before the adjustment, a value twice the stored tempo value or a value half the stored tempo value, whichever is closest to the tempo value received by the tempo input receiving section.

The present invention may alternatively be in the form of a music search method carried out by the music search device as described above. The present invention may alternatively be in the form of a program for instructing a computer to carry out such a music search method, or a storage medium storing such a program.

According to the present invention, the user inputs an impression quantity for a tune, whereby the mapping function is updated so as to better reflect the user's image of the tune. Specifically, a new mapping function is obtained based on sets of impression quantities inputted by the user and the associated characteristic quantities, in addition to the sets of impression quantities and characteristic quantities included in the mapping function source data before the impression quantity is inputted by the user. The new mapping function better reflects the perception of the user, and the music search device using such a mapping function will produce search results that better agree with the perception of the user.

If the impression quantity is represented as the first impression value or the second impression value, the following advantage can be obtained. The mapping function converts the characteristic quantity and the lower-dimensional second impression value to each other, and it is easier to obtain such a mapping function than to obtain a mapping function that converts the characteristic quantity and the higher-dimensional first impression value to each other.

Where the search section includes the search data generation section and the second impression value receiving section, the user can easily make an adjustment input using the lower-dimensional second impression value.

Where the search section includes the search data generation section and the first impression value receiving section, the user can make a more detailed adjustment input by using the higher-dimensional first impression value.

Where the reference table further contains the tune weight, the following advantage can be obtained. When the user inputs an impression quantity for a tune, the tune weight is also updated for other tunes (including sample tunes). The tune weight is taken into consideration when obtaining a mapping function. Thus, by obtaining a mapping function using the tune weight, it is possible to update the mapping function so as to more accurately reflect the perception of the user. For example, the tune weight can be decreased for tunes having impression quantities close to the impression quantity inputted by the user so as to reduce the influence of such tunes on a new mapping function to be obtained. Then, data sets of the impression quantity and the characteristic quantity that do not agree with the perception of the user will have less influence on the new mapping function to be obtained. Thus, the mapping function can be updated so as to more accurately reflect the perception of the user.

Where a plurality of types of reference tables are stored in the reference table storage section as pieces of evaluation data, with a data weight being associated with each piece of the evaluation data, the following advantage can be obtained. A plurality of pieces of evaluation data are prepared in advance with a data weight being associated with each piece of the evaluation data, and a single reference table is derived therefrom. Then, a mapping function is obtained based on the single reference table. As the single reference table varies depending on the data weight, the mapping function also varies depending on the data weight. Therefore, by updating the data weight when the user inputs an impression quantity, it is possible to update the mapping function so as to more accurately reflect the perception of the user. For example, the data weight is increased for the reference table containing a set of values closer to the set of the impression quantity inputted by the user and the associated characteristic quantity. Thus, the single reference table will more closely represent the perception of the user. Accordingly, it is possible to update the mapping function so as to more accurately reflect the perception of the user.

Where the music search device includes the selection input receiving section and the reproduction section, a tune for which the user is inputting an impression value is reproduced, whereby the user can input the impression value while listening to the tune. Therefore, the user can input an impression value that accurately reflects the perception of the user.

Where the music search device further includes the impression quantity presentation section, the user inputting an impression quantity for a tune is presented with the impression value of the tune obtained by using the current mapping function before being updated. Therefore, the user can decide on the impression value to be inputted based on the presented impression quantity, whereby the user can easily input an impression value that accurately reflects the perception of the user.

Moreover, where the music search device further includes the preset word table storage section and the preset word presentation section, the user inputting an impression value for a tune is presented with the impression quantity of the tune in the form of a preset word. Therefore, the user can decide on the impression value to be inputted based on the presented preset word, whereby the user can easily input the impression value including a plurality of characteristics.

Where the music search device includes the preset word display section, the preset word receiving section and the impression quantity conversion section, the user can input an impression quantity by selecting a preset word. Thus, the user can easily input an impression quantity with a simple operation without having to individually determine the various characteristics of the impression quantity.

Where the impression quantity in the preset word table can be adjusted by the user, the user can freely set an impression quantity for each preset word. Therefore, the user can set, in the preset word table, a preset word that reflects the perception of the user.

Where the music search device further includes the tempo input receiving section and the tempo updating section, the following advantage can be obtained. While the tempo value is calculated in advance, it may be a different value than the actual tempo of the tune (i.e., an erroneous tempo value). Even in such a case, the user can adjust the tempo value of the tune stored in the tune data storage section to a correct tempo value. By adjusting the characteristic quantity to a correct value, it is possible to perform a more accurate tune search.

The tempo updating section uses, as an adjusted tempo value, either the tempo value as stored in the tune data storage section before the adjustment, a value twice the stored tempo value or a value half the stored tempo value, whichever is closest to the tempo value received by the adjustment receiving section. Then, the following advantage can be obtained. Based on the tempo value inputted by the user, the tempo value is determined to be either half the stored tempo value, the stored tempo value (as it is) or twice the stored tempo value. When a tempo value is erroneously calculated, the erroneous tempo value is likely to be either half or twice the actual tempo value. While a human listening to a tune may not be able to accurately determine the exact tempo of the tune, it is easy for a human to make a rough estimation of the tempo as being "fast", "medium" or "slow". Thus, if the user inputs a rough tempo value as described above, it is possible to accurately correct an erroneously calculated tempo value.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A and FIG. 3B show an example of a reference table stored in a reference table storage section 3;

FIG. 4 shows an example of a tune database 1;

FIG. 6 shows an example of mapping function source data;

DETAILED DESCRIPTION OF THE PREFERRED EMBODIMENTS

First Embodiment

Figure 1:
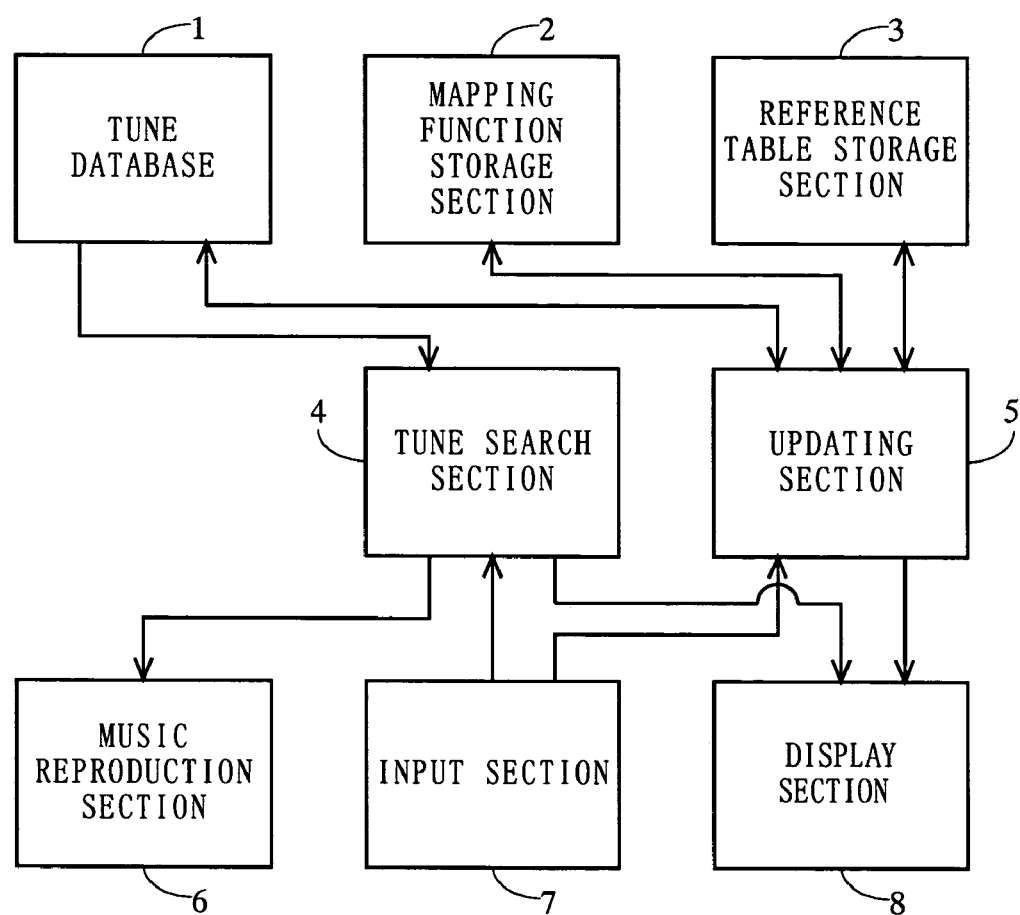
FIG. 1 is a block diagram illustrating a music search device according to a first embodiment of the present invention.

FIG. 1 is a block diagram illustrating a functional configuration of a music search device according to a first embodiment of the present invention. Referring to FIG. 1, the music search device includes a tune database 1, a mapping function storage section 2, a reference table storage section 3, a tune search section 4, an updating section 5, a music reproduction section 6, an input section 7 and a display section 8. The present music search device searches for a tune by using an impression quantity. The impression quantity of a tune as used herein is obtained by quantifying the listener's impression of the tune.

The tune database 1 contains a number of tunes associated with their respective music data, related information, characteristic quantities, etc. The characteristic quantity of a tune as used herein is obtained by quantifying characteristics of the tune. The characteristic quantity of a tune represents musical characteristics of the tune, such as the tempo, the beat, etc., of the tune. The characteristic quantity is usually a combination of a plurality of characteristics. In other words, the characteristic quantity is a vector, which is usually a multidimensional vector. The characteristic quantity may alternatively be a one-dimensional scalar quantity. The tune database 1 is shown in FIG. 4 in detail.

The reference table storage section 3 stores a reference table containing a number of sets of the characteristic quantity and the impression quantity. The reference table is provided by the manufacturer of the music search device. Thus, the reference table is provided by default in the music search device. The sets of the characteristic quantity and the impression quantity to be contained in the reference table are obtained by the manufacturer evaluating a plurality of tunes.

The mapping function storage section 2 stores a mapping function. The mapping function is used for the conversion between the characteristic quantity and the impression quantity to search for tunes stored in the tune database 1. The mapping function is derived from the reference table and an adjustment table. The adjustment table contains sets of the characteristic quantity and the impression quantity for tunes that are stored in the tune database 1. The adjustment table is not present (provided) by default, but is created when a mapping function adjustment input (to be described later) is received from the user. When the mapping function adjustment input is received, the mapping function is updated by obtaining a mapping function anew by using the adjustment table in addition to the reference table. Thus, the mapping function is updated so as to better agree with the perception of the user. In the first embodiment, the adjustment table is a part of the tune database 1. The default mapping function is derived from only the reference table.

The updating section 5 performs operations such as updating the mapping function. Specifically, the updating section 5 receives an impression quantity for a tune stored in the tune database 1 from the user as a mapping function adjustment input. The updating section 5 adds to the adjustment table the received impression quantity and the characteristic quantity for the tune corresponding to the impression quantity. A mapping function is obtained anew from the adjustment table and the reference table. Thus, the mapping function in the mapping function storage section 2 is updated to better reflect the perception of the user.

The tune search section 4 searches for a tune stored in the tune database 1. Specifically, the tune search section 4 receives an impression quantity from the user as a tune data search instruction. Then, the tune search section 4 searches for tune data stored in the tune database 1 by using the received impression quantity and search data. The search data as used herein refers to data obtained by calculating the impression value for each of the tunes stored in the tune database 1. The search data is shown in FIG. 6 in detail.

The music reproduction section 6 reads out data of a tune from the tune database 1 to reproduce the tune. The input section 7 receives the mapping function adjustment input and the tune data search instruction from the user. The display section 8 displays various information to assist the user in giving the mapping function adjustment input and the tune data search instruction (see FIG. 7 and FIG. 8).

The operation of the music search device will now be described. In the first embodiment, two types of impression quantities are used, i.e., a first impression value and a second impression value. Specifically, the first impression value is a five-dimensional vector value that is obtained by quantifying the listener's impression of the tune based on five characteristics, including "violent-ness" and "refreshing-ness". The second impression value is a two-dimensional vector value that is obtained by decreasing the number of dimensions of the first impression value by a principal component analysis to be described later.

Figure 2:
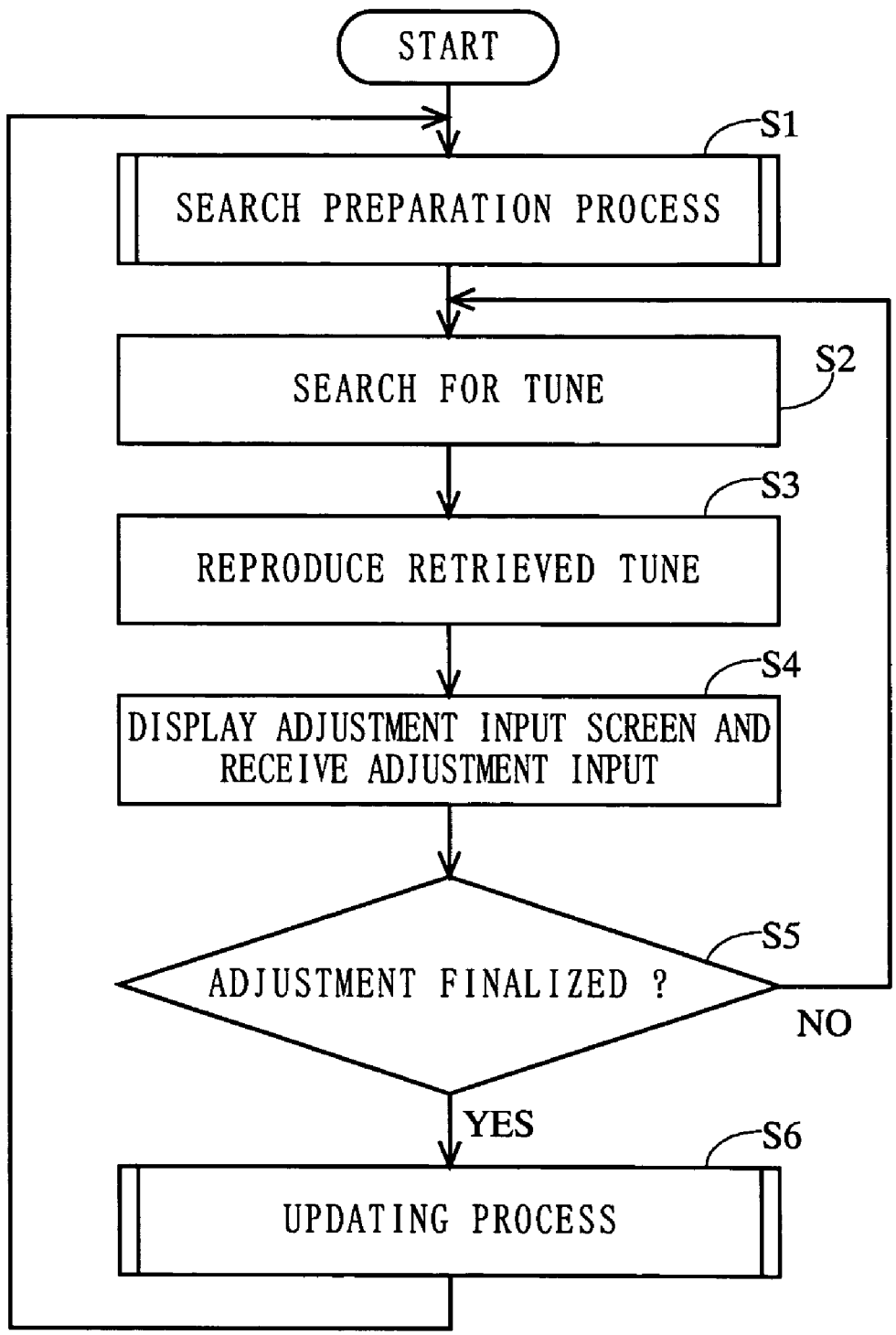
FIG. 2 is a flowchart illustrating the flow of a process performed by the music search device of the first embodiment.

FIG. 2 is a flowchart illustrating the flow of a process performed by the music search device of the first embodiment. First, in step S1, a search preparation process is performed. The search preparation process is a process of performing preparations that are necessary for the tune search process in steps S2 and S3. In the search preparation process, data that is necessary for the tune search process is created from the data stored in the tune database 1 and the reference table. The data stored in the tune database 1 and the reference table will now be described in detail before illustrating the search preparation process.

FIG. 3A and FIG. 3B show an example of the reference table stored in the reference table storage section 3. In the first embodiment, the reference table includes an evaluated tune table and a first impression value table. FIG. 3A shows an example of the evaluated tune table. As shown in FIG. 3A, the evaluated tune table contains a characteristic quantity and a tune weight for each evaluated tune that has been assigned an evaluated tune number. Each evaluated tune number is a unique number for identifying a particular tune. Thus, in the evaluated tune table, each tune identified by the evaluated tune number is associated with the characteristic quantity (obtained in advance) of the tune. The tune weight is a value representing the degree to which the evaluation of the tune (the characteristic quantity and the first impression value associated with each other) is to be reflected in the creation of a mapping function. The initial tune weight value is 1.0, and the value is updated by the updating section 5.

The reference table is predefined by the manufacturer of the music search device. While the evaluated tune number identifies a particular tune, the music data and the related information for the tune do not have to be stored in the music search device. The reference table is only required to contain the characteristic quantity and the impression quantity associated with each other for each tune identified by the evaluated tune number, and does not have to contain the music data for the tune. Herein, a tune identified by an evaluated tune number (whose music data is not stored in the music search device) will be referred to as a sample tune so as to differentiate it from a tune stored in the tune database 1 (whose music data is stored in the music search device).

FIG. 3B shows an example of the first impression value table. The first impression value table contains evaluation data obtained from a number n of human evaluators (n is a natural number). Each piece of evaluation data includes an evaluator number identifying the evaluator for the piece of evaluation data, the data weight for the evaluator, and first impression values each associated with an evaluated tune number. The evaluation data of an evaluator represents the first impression value set by the evaluator for each tune identified by the evaluated tune number. For example, the upper piece of evaluation data in FIG. 3B indicates that an evaluator whose evaluator number is 1 has set the violent-ness level to 4 and the refreshing-ness level to 3 for a tune whose evaluated tune number is 1. The data weight for an evaluator is a value representing the degree to which the first impression values set by the evaluator are to be reflected in the creation of a mapping function. The initial data weight value is 1.0, and the value is updated by the updating section 5.

In the first embodiment, the range of the first impression value for each characteristic is from 1 (minimum value) to 7 (maximum value). For example, if the first impression value includes a characteristic "violent-ness", the value of the characteristic being 7 means "most violent" and the value thereof being 1 means "calmest". Similarly, if the first impression value includes a characteristic "refreshing-ness", the value of the characteristic being 7 means "most refreshing" and the value thereof being 1 means "least refreshing". Thus, each characteristic of the first impression value is represented by a pair of contrasted words such as "violent"-"calm" or "refreshing"-"not refreshing". The first impression value of a tune identified by the evaluated tune number is expressed as "violent-ness=4.5, refreshing-ness=2.7", for example, and is a combination of five characteristics in the first embodiment.

The contents of the reference table can be added or deleted as necessary, and the number of tunes to be evaluated and the number of evaluators may be increased or decreased.

FIG. 4 shows an example of the tune database 1. The tune database 1 contains the music data, the related information, the characteristic quantity, the evaluation flag, the first impression value and the tune weight for each tune identified by a tune number. The music data of a tune may be a linear-PCM waveform data of the tune, or may be in a compressed format such as AAC, for example. The related information on a tune may include various information items related to the tune, including the title, the artist name, the album title, the lyricist name, the composer name, the arranger name, the genre, etc., of the tune. The evaluation flag of a tune indicates whether or not the user has inputted the first impression value for the tune. Specifically, the evaluation flag being true (i.e., flag="1") indicates that there is already a first impression value inputted by the user in the tune database 1. The evaluation flag being false (i.e., flag="0") indicates that the first impression value is null and the evaluation weight is 0. The adjustment table corresponds to a part (i.e., the characteristic quantity and the first impression value) of the whole data contained in the tune database 1.

The contents of the tune data base 1 can be added or deleted as necessary. In the first embodiment, when a tune is added to the music search device, the tune is assigned a tune number automatically, and the characteristic quantity of the tune is automatically calculated after the music data thereof is registered. At this time, the first impression value is set to null, the evaluation flag to false, and the tune weight to an initial value of 0.

Figure 5:
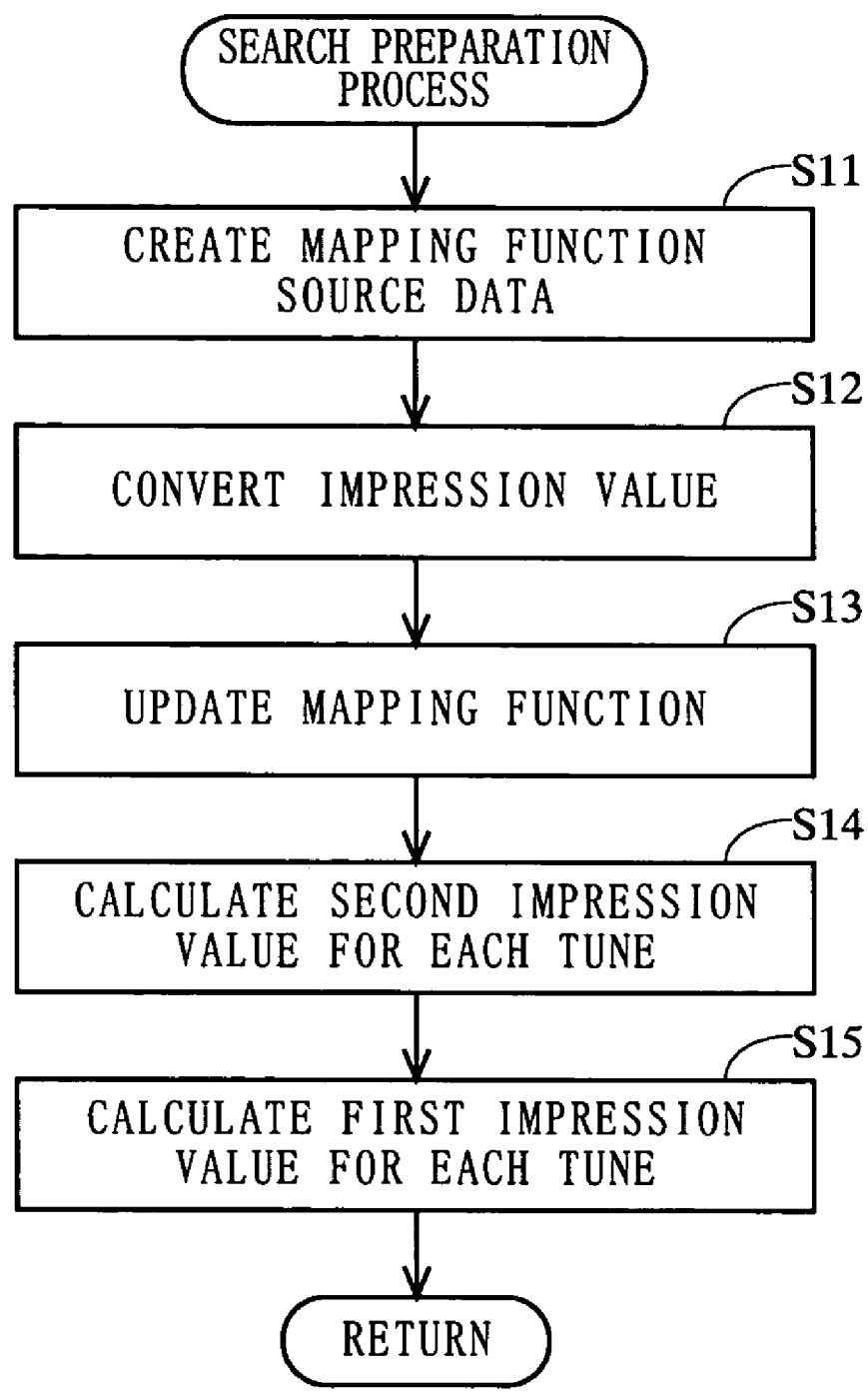
FIG. 5 is a flow chart illustrating step S1 of FIG. 2 in detail.

The search preparation process will now be described. FIG. 5 is a flow chart illustrating step S1 of FIG. 2 in detail. First, in step S11, the updating section 5 creates mapping function source data for generating a mapping function. The mapping function source data as used herein refers to sets of characteristic quantities and first impression values contained in the reference table and the adjustment table.

In step S11, the updating section 5 first puts together n characteristics of the first impression value for each piece of evaluation data contained in the first impression value table of the reference table into a single vector value. Specifically, n first impression values associated with the same evaluated tune number are put together into one. While each characteristic is given a data weight in this calculation in the first embodiment, a simple average of the n characteristics may alternatively be used in other embodiments. This process of putting together the first impression values into a single vector value is performed for each evaluated tune number. This process yields a first impression value (a vector value) for each evaluated tune number. The obtained first impression value is registered as the mapping function source data together with the associated characteristic quantity and tune weight (stored in the evaluated tune table). Then, the first impression value, the characteristic quantity and the evaluation weight for those tunes in the tune database 1 whose evaluation flag is true (i.e., those tunes that has already been evaluated by the user) are added to the mapping function source data. Thus, a portion of the tune database 1 that corresponds to the adjustment table is added to the mapping function source data.

FIG. 6 shows an example of the mapping function source data. As shown in FIG. 6, the mapping function source data includes the characteristic quantity, the first impression value and the tune weight associated with one another. In the mapping function source data, each tune is assigned a mapping function data number.

In step S12, the updating section 5 performs the principal component analysis on the first impression value of the mapping function source data. Thus, the first impression value is converted to the second impression value by using the principal component analysis. The optimal number of dimensions of the converted second impression value obtained by the principal component analysis may be two, but the number of dimensions of the converted second impression value may vary depending on the types, the number, etc., of characteristics of the first impression value. In other words, in step S12, the principal component analysis is performed to obtain the function (impression value conversion function) for converting the first impression value to the second impression value. Also, in this step, each five-dimensional first impression value included in the mapping function source data is converted to a two-dimensional second impression value by the impression value conversion function. The second impression value obtained in step S12 will be referred to as a mapping impression value. With the use of the principal component analysis, the impression quantity representing a tune's image is reduced to a lower-dimensional vector value, thereby reducing the amount of calculation required for the search process. In a case where the mapping function source data includes a large number of pieces of data, the number of pieces of data to be subjected to the process of step S12 may be reduced by, for example, extracting a predetermined number of pieces of data having the largest evaluation weight values.

In step S13, the updating section 5 updates the mapping function stored in the mapping function storage section 2. Specifically, a mapping function is obtained anew based on the characteristic quantities of the mapping function source data and the associated mapping impression values (second impression values) calculated in step S12. Then, the obtained mapping function is stored in the mapping function storage section 2. The mapping function can be created by using a multiple regression analysis, a neural network method, or the like. In the neural network back propagation, the error of each tune can be calculated while using the tune weight of the tune as a multiplier coefficient so as to create a network in which more important data pieces are reflected more strongly.

In step S14, the updating section 5 applies the mapping function from step S13 to the characteristic quantity of each tune registered in the tune database 1 to obtain the second impression value of the tune. In step S15, the updating section 5 estimates the first impression value for each tune registered in the tune database 1 whose evaluation flag is false. In other words, for each tune registered in the tune database 1 whose first impression value has not been set, the first impression value is calculated based on the second impression value obtained in step S14. Specifically, one or more tunes having second impression values close to the second impression value of the tune whose first impression value is to be estimated are selected. Then, the average value among the first impression values of the selected tunes is used as the first impression value of the tune in question. The average first impression value may be calculated while weighting the first impression value of each selected tune according to how close its second impression value is to that of the tune in question. The calculated average first impression value will be referred to as an estimated first impression value. Note that the updating section 5 registers the estimated first impression value in the tune database 1 in step S15, while the evaluation flag of the tune whose estimated first impression value is being registered is left false. Through steps S14 and S15 as described above, the second impression value is calculated for all of the tunes stored in the tune database 1. The data set including the tunes stored in the tune database 1 and the second impression values thereof will be referred to as search data. The search process of steps S2 and S3 is performed by using the search data created in steps S14 and S15. Thus, the search preparation process is completed through steps S11 to S15 as described above.

Referring back to FIG. 2, a tune is searched for and reproduced in steps S2 and S3. The search operation is performed for the tunes stored in the tune database 1. The search operation of step S2 is performed for allowing the user to adjust the mapping function (in step S4 to be described later). Specifically, in step S2, the user inputs search parameters for searching for a tune for which the user wishes to adjust the mapping function. In response to the user's input, the music search device searches for a tune. Then, in step S3, information (the impression quantity, etc.) on the retrieved tune is presented to the user as search results. A search for a tune that the user wishes to be reproduced can be performed by a process similar to that of step S2. Steps S2 and S3 will now be described in detail.

In step S2, the tune search section 4 performs the tune search process. The tune search section 4 prompts the user to input parameters for a search for a tune for which the user wishes to input the impression quantity. Specifically, the tune search section 4 first displays a search screen in the display section 8.

Figure 7:
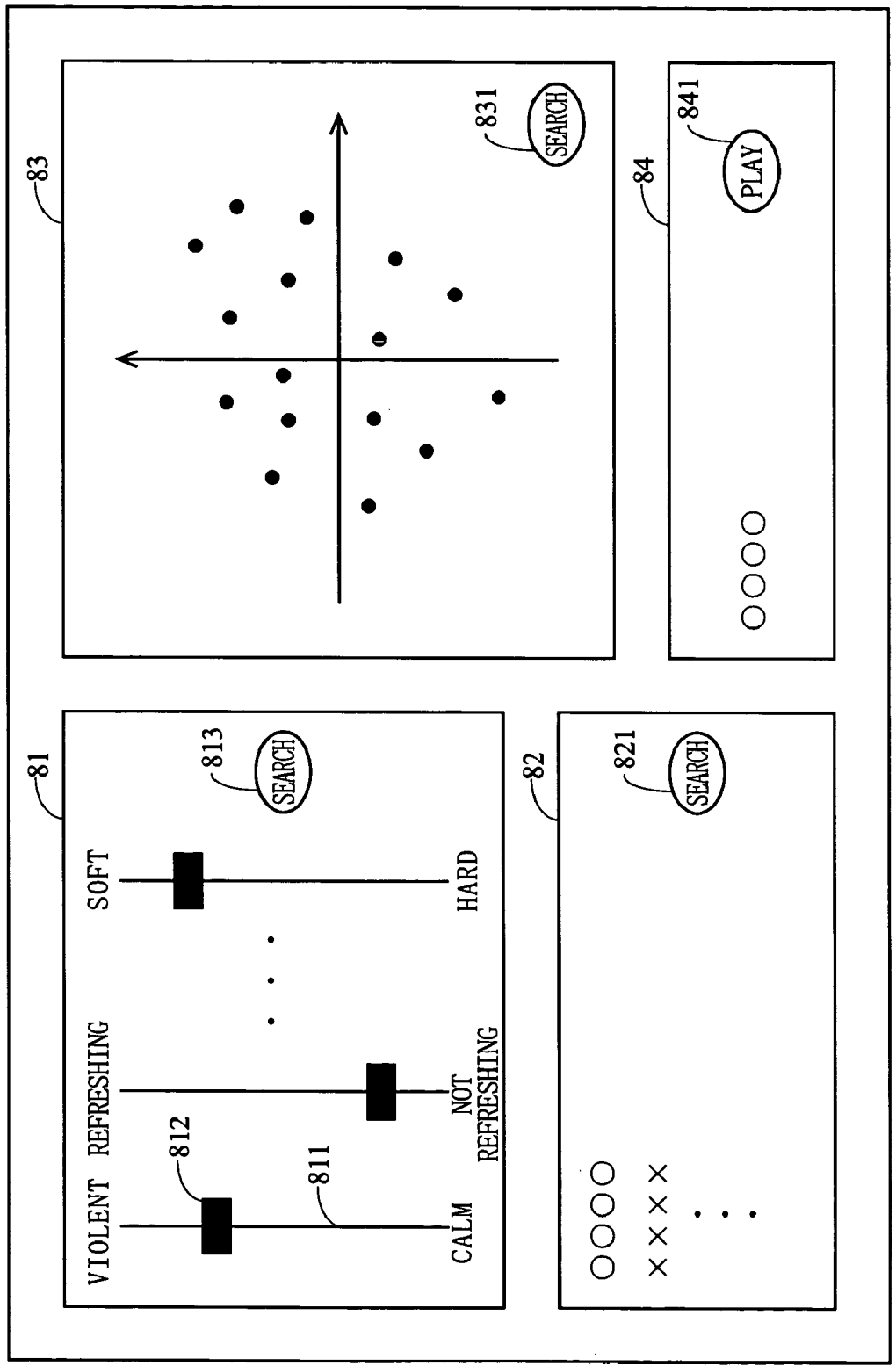
FIG. 7 shows an example of a search screen.

FIG. 7 shows an example of the search screen. Referring to FIG. 7, the search screen includes a first impression value section 81, a text display section 82, a second impression value section 83 and a search result display section 84 in the first embodiment. The user inputs search parameters by using either the first impression value section 81, the text display section 82 or the second impression value section 83.

In the first impression value section 81, a gauge 811, a value adjustment tab 812 and a search button 813 are displayed for each of the five characteristics of the first impression value. The value adjustment tab 812 being positioned closer to the upper end of the gauge 811 indicates a higher value. The value adjustment tab 812 being positioned at the upper end of the gauge 811 indicates a maximum value of 7, and the value adjustment tab 812 being positioned at the lower end of the gauge 811 indicates a minimum value of 1. The user can adjust the first impression value by moving the value adjustment tab 812 along the gauge 811 for each of the five characteristics of the first impression value. For example, if the user wishes to search for a tune whose violent-ness level is 5 and whose refreshing-ness level is 2, the user can move the value adjustment tab 812 for each of the characteristics to a corresponding position along the gauge 811. For example, the value adjustment tab 812 can be dragged by the user using the input section 7, which may be a mouse. By moving the value adjustment tab 812, the user adjusts the first impression value of a tune to be searched for. After the first impression value of the tune to be searched for is set by the user, the user can press the search button 813 to execute a search using the set first impression value. The operation of pressing a button displayed on a screen herein refers to, for example, the operation of activating the button with a mouse cursor.

In the search operation, the tune search section 4 converts the first impression value set by the user to a second impression value by using the conversion function obtained in step S12. The obtained second impression value is herein referred to as a target impression value. Moreover, the tune search section 4 performs the search operation by using the search data created in steps S14 and S15 (the data set including the tunes stored in the tune database 1 and the second impression values thereof). Specifically, a tune having a second impression value close to the target impression value is retrieved by the search operation. The search results are displayed in the search result display section 84. Specifically, a part or whole of the related information on the retrieved tune (stored in the tune database 1) is displayed in the search result display section 84. The search results may present only a single tune having a second impression value closest to the target impression value, or a plurality of tunes in the order of how close the second impression value is to the target impression value.

In the text display section 82, tunes are presented to the user by their titles and artist names, for example. The user specifies a tune for which the user wishes to make an adjustment input by its title or artist name, and presses a search button 821. Thus, an intended tune is specified by its title or artist name. The search results are displayed in the search result display section 84. In other embodiments, one or more other tunes having impression quantities close to that of the specified tune can be displayed together with the specified tune. In such a case, tunes of a similar image to that of the specified tune can also be retrieved.

In the second impression value section 83, tunes are presented to the user by their second impression values obtained in step S14. In the first embodiment, since the second impression value is two-dimensional data, a tune can be represented as a dot in a plane. The user can select one of the dots displayed in the second impression value section 83 and press a search button 831 to specify a tune represented by the selected dot. Then, related information on the specified tune is displayed in the search result display section 84. In other embodiments, one or more other tunes having impression quantities close to that of the specified tune can be displayed together with the specified tune.

The search result display section 84 shows the related information on one or more tunes that have been retrieved by using the first impression value section 81, the text display section 82 or the second impression value section 83.

In step S2, after the related information on the retrieved tunes is displayed in the search result display section 84, the tune search section 4 receives, via the input section 7, an input from the user specifying one of the tunes displayed in the search result display section 84. Specifically, the user selects one of the tunes displayed in the search result display section 84 and presses a play button 841 to determine a tune to be reproduced in step S3 (a tune for which the user wishes to make an adjustment input).

In a case where the input section 7 is implemented by a mouse, a touch panel display, or the like, connected to a PC, the user may select a tune by a single click on the search screen of FIG. 7 by using the mouse or the touch panel (the tune may be reproduced at this time in a preview mode), or the user may use a double click to proceed to step S3 where the tune is reproduced, as if the user pressed the play button 841 after selecting a tune by a single click.

In the first embodiment, a tune for which the impression quantity is to be adjusted is determined by a tune search operation based on the impression quantity or by specifying the tune using the related information thereof, as described above. The music search device may alternatively determine a tune for which the impression quantity is to be adjusted by a tune search operation based on the related information (the title or the artist name). Moreover, while a tune search operation based on the impression value is performed for determining a tune for which the impression quantity is to be adjusted, a tune to be reproduced may be searched for by a similar tune search operation.

Then, in step S3, the updating section 5 reproduces, at the music reproduction section 6, the tune determined in the search process of step S2. Specifically, the music reproduction section 6 retrieves the data of the tune from the tune database 1 and reproduces the tune. Then, in step S4, the updating section 5 displays an adjustment input screen and receives an adjustment input from the user. Specifically, the updating section 5 switches the screen displayed in the display section 8 from the search screen to the adjustment input screen.

Figure 8:
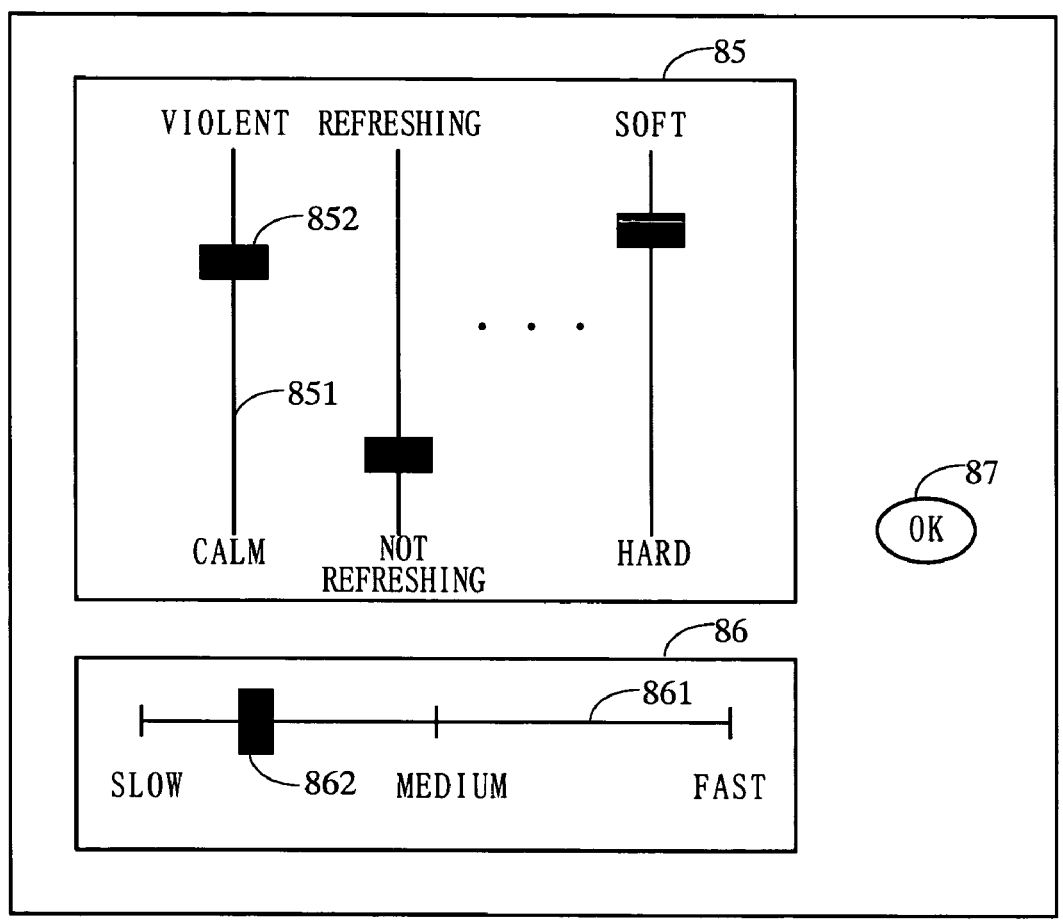
FIG. 8 shows an example of an adjustment input screen.

FIG. 8 shows an example of the adjustment input screen. Referring to FIG. 8, the adjustment input screen includes a first impression value adjustment section 85 and a tempo adjustment section 86. The first impression value adjustment section 85 is the same as the first impression value section 81 except for the absence of the search button 813. Before the user makes an adjustment input, a value adjustment tab 852 for each characteristic of the first impression value is displayed at a position corresponding to the first impression value as stored in the tune database 1. Then, the user makes an adjustment input by adjusting the displayed first impression value. Specifically, the user adjusts the first impression value according to the image that the user has for the tune while the user listens to the tune being reproduced. The method of adjusting the first impression value in the first impression value section 81 in FIG. 8 is similar to that in the first impression value section 81 described above. The adjustment input by the user is received by the updating section 5. Specifically, the updating section 5 receives the input specifying the first impression value via the input section 7. It is easy for the user to determine the level of each value because the adjustment input can be made with respect to the initial tab position as a reference.

In the tempo adjustment section 86, the tempo of the tune being reproduced is displayed. It is assumed in the first embodiment that the tempo is included as one characteristic. The tempo (the value thereof) is represented by the position of a value adjustment tab 862 along a gauge 861. The gauge 861 is marked "SLOW", "MEDIUM" and "FAST" at positions corresponding to BPM (Beats Per Minute) values of 60, 120 and 180, respectively. Thus, the tempo value as indicated by the position of the value adjustment tab 862 increases from left to right along the gauge 861. If the BPM value before adjustment by the user is smaller than 60 or larger than 180, the value adjustment tab 862 is displayed at a position corresponding to the BPM value of 60 or 180, respectively.

The user can adjust the tempo value shown in the screen of FIG. 8 as the user may feel that the tempo value is higher or lower than displayed while listening to the tune being reproduced. For example, the value adjustment tab 862 can be dragged by the user using the input section 7, which may be a mouse. The updating section 5 receives the tempo adjustment input. As described above, the tempo adjustment is inputted by the user moving the value adjustment tab 862 by using the input section 7. As when inputting the first impression value, it is easy for the user to determine the level of the value to be inputted because the adjustment input can be made with respect to the initial tab position as a reference.

As described above, the updating section 5 receives the mapping function adjustment input and the tempo adjustment input while the adjustment input screen is displayed. The user adjusts the tempo value, in addition to the first impression value, for the following reason.

The tempo, being one characteristic of a tune, is a very important factor in searching for tunes based on their images, and is particularly correlative to musical impression indices such as violent-ness, activeness, etc. A tempo of a tune automatically determined by a program may erroneously be half or twice the actual tempo of the tune. As a result, a slow-tempo tune may be erroneously determined as a fast-tempo tune, and thus as a "violent" tune, and vice versa. Moreover, if there is data of a tune whose tempo is determined erroneously, a search for that tune is affected.

Furthermore, a mapping function obtained by using an erroneously-determined tempo value as a characteristic quantity will be an erroneous mapping function that affects all search results. Therefore, in the first embodiment, the user is given an opportunity to adjust the tempo so that more accurate tempo values can be obtained.

While a program may erroneously determine the tempo of a tune, a human listening to a tune is capable of roughly determining the tempo of the tune. While a human may not be able to accurately determine the exact tempo of a tune, it is unlikely that a human would be unable to make a rough estimation of the tempo as being "fast", "medium" or "slow". When a program calculates and outputs an erroneous tempo value, the correct tempo value is likely to be either half or twice the calculated tempo value. Therefore, even though the user can only roughly determine the tempo, the music search device can obtain a correct value by having the user estimate whether the tempo outputted by the program seems to be correct, too fast or too slow.

Specifically, the user roughly sets a tempo value along the gauge 861 in the screen of FIG. 8 according to how fast or slow the tune sounds to the user actually listening to the tune. Then, a corrected tempo value is obtained, as being either half the calculated tempo value as it is, half the calculated tempo value or twice the calculated tempo value, whichever is closest to the value inputted by the user. Thus, a correct value can be obtained from a rough value inputted by the user. Instead of moving the value adjustment tab 862 along the gauge 861, the tempo value can alternatively be inputted by pressing one of three buttons captioned "SLOW", "MEDIUM" and "FAST" in the screen. While the slow, medium and fast tempo values are herein set to 60, 120 and 180, respectively, other tempo value settings may be employed.

Referring back to FIG. 2, in step S5, the updating section 5 determines whether or not the adjustments to the first impression value and the tempo value have been finalized. The determination is based on whether or not an OK button 87 in the adjustment input screen is pressed within a predetermined amount of time. If the OK button 87 is pressed within a predetermined amount of time, the control proceeds to step S6 for the updating process. Otherwise, the control returns to the process of step S2. In the first embodiment, the control proceeds to step S6 if the OK button 87 is pressed with no adjustments having been made to the first impression value or the tempo. In other embodiments, the control may return directly to step S1 while skipping step S6 if the OK button 87 is pressed with no adjustments made to the first impression value or the tempo.

Figure 9:
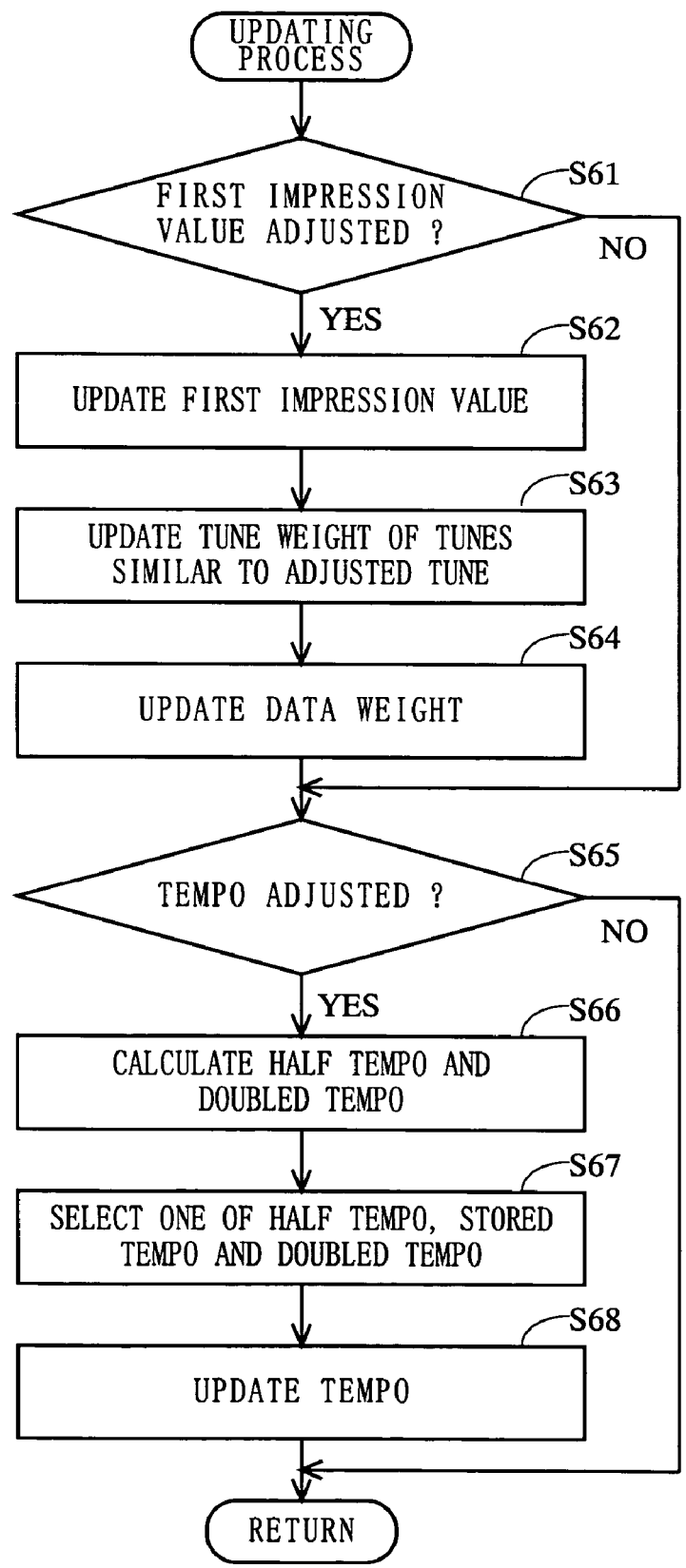
FIG. 9 is a flow chart illustrating step S6 of FIG. 2 in detail.

FIG. 9 is a flow chart illustrating step S6 of FIG. 2 in detail. The updating process of step S6 is performed by the updating section 5 to update the tune database 1 and the reference table with the adjustments made in step S5. First, in step S61, it is determined whether or not the first impression value has been adjusted in step S5. If not, the control proceeds to step S65, and otherwise the control proceeds to step S62.

In step S62, the updating section 5 updates the first impression value in the adjustment table. Specifically, the updating section 5 sets the evaluation flag to true in the tune database 1 for the tune for which an adjustment input is being made, and initializes the tune weight of the tune. The tune weight is initialized to 2.0, which is larger than the initial value of the tune weight in the reference table. This is because the impression quantity of a tune that is inputted by the user is more important than those of the sample tunes in the reference table. Moreover, the updating section 5 writes the first impression value from step S5 to the tune database 1 for the tune for which an adjustment input is being made. If a first impression value for the tune already exists in the tune database 1, the updating section 5 updates the first impression value to that from step S5. Thus, a new data set (a set of the characteristic quantity and the impression quantity) is added to the adjustment table.

In step S63, the updating section 5 selects, from the reference table and the adjustment table, tunes similar to the tune for which an adjustment input is being made, and updates the tune weight of such similar tunes. Specifically, the tune weight is decreased for the similar tunes. A tune is determined to be similar to the tune for which an adjustment input is being made if the first impression value thereof is close to that of the tune for which an adjustment input is being made. The determination may alternatively be based on the second impression value, instead of the first impression value. In the first embodiment, the evaluation weight is decreased by 0.2 for five tunes whose first impression values are closest to that of the tune for which an adjustment input is being made. Therefore, the data set adjusted by the user (the set of the first impression value from step S5 and the corresponding characteristic quantity) will have less influence on mapping functions to be created subsequently. Moreover, in a case where tunes having largest tune weight values are used in the creation of the mapping function source data, it is possible to prevent the music search device from redundantly learning about tunes of similar first impression values in the creation of the mapping function.

In step S64, the updating section 5 updates the data weight in the reference table. Specifically, the updating section 5 first selects a plurality of tunes from the reference table that are similar to the tune for which an adjustment input is being made. Whether or not a tune is similar to the tune for which an adjustment input is being made is determined as in step S63. Then, the updating section 5 calculates the average first impression value based on the evaluation data shown in FIG. 3B for the selected tunes. For example, where a tune whose evaluated tune number is 1 is being selected, the average of the first impression values of the tune from different evaluators is calculated. Moreover, for each piece of the evaluation data, the updating section 5 calculates the error between the first impression value (from step S5) of the tune for which an adjustment input is being made and the average first impression value. The data weight of each piece of the evaluation data is updated based on the error. For example, 0.05 is added to the data weight of the piece of the evaluation data for which the error is smallest, and 0.05 is subtracted from the data weight of the piece of the evaluation data for which the error is largest. The data weight values are updated so that the difference between values before and after the update is larger for the data weight of the piece of the evaluation data for which the error is smaller. In the present embodiment, the maximum value and the minimum value of the data weight are 2.0 and 0, respectively.

In step S65, the updating section 5 determines whether or not the tempo has been adjusted in step S5. If not, the control proceeds to step S66, and otherwise the control exits the updating process.

In step S66, the updating section 5 calculates tempo values HTT and DTT based on the tempo value TT (as stored in the tune database 1) of the tune for which an adjustment input is being made. The tempo value HTT is half the tempo value TT, and the tempo value DTT is twice the tempo value TT. Then, in step S67, the updating section 5 selects one of the tempo values TT, HTT and DTT that is closest to the inputted tempo value FT from step S5 and regards the selected tempo value as the correct tempo value CT. Finally, in step S68, the updating section 5 updates the tempo value in the tune database 1 to the tempo value CT. Thus, the updating process is completed.

Referring back to FIG. 2, the process of step S1 is performed following step S6. In step S1, a new mapping function is created taking into consideration the user's input from step S5. Thus, subsequent search processes will give search results that better agree with the perception of the user.

Figure 10:
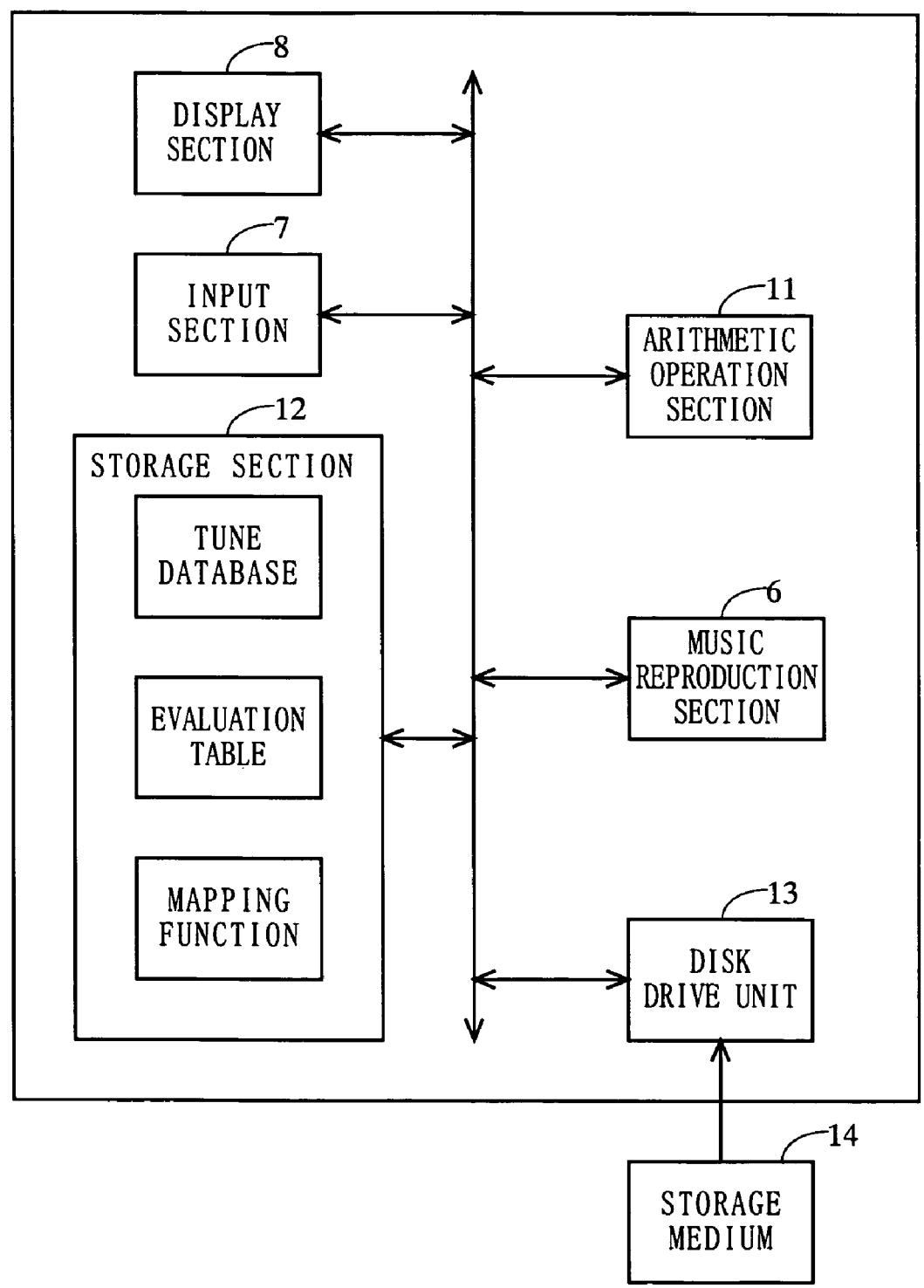
FIG. 10 is a block diagram illustrating a configuration of the music search device of the first embodiment implemented by a computer.

The music search device of the first embodiment as described above can be implemented by a general-purpose computer executing a predetermined program. FIG. 10 is a block diagram illustrating a configuration of the music search device of the first embodiment implemented by a computer. Referring to FIG. 10, a computer being the music search device includes an arithmetic operation section 11 (e.g., a CPU and a memory), a storage section 12 (e.g., a hard disk drive), the music reproduction section 6 (e.g., a loudspeaker), the input section 7 (e.g., a keyboard and/or a mouse), the display section 8 (e.g., a display), and a disk drive unit 13. The arithmetic operation section 11 functions as the tune search section 4 and the updating section 5 shown in FIG. 1. The storage section 12 corresponds to the tune database 1, the mapping function storage section 2 and the reference table storage section 3 shown in FIG. 1. The disk drive unit 13 reads out, from a storage medium 14, a program for making the computer function as the music search device. The storage medium 14 for storing the program may be any type of a computer-readable storage medium such as a flexible disk or an optical disk. By installing the program on a computer, the computer can function as the music search device. The program may be provided in a storage medium or may alternatively be distributed via the Internet, etc. The process in the music search device of the first embodiment (the process shown in FIG. 2) may be performed by a hardware device provided in, or connected to, the computer, or at least a part of the process may be realized by means of software executed by the computer.

While the updating process (step S6) is performed each time the user makes an adjustment input in the first embodiment, the process does not have to be performed each time the user makes an adjustment input in other embodiments where it is desired to reduce the processing load on the music search device. For example, the updating process may be performed for every few adjustment inputs, or the updating process may be performed only at the start-up of the music search device.

While the present invention has been described above with respect to a device for searching for musical tunes, the present invention may also be used in the search for other types of information contents. For example, image data may be searched for, in which case the characteristic quantity may include brightness, hue, etc., of an image, and the impression quantity may be a value representing how bright or dark the image appears. A display for displaying an image can be used in place of the music reproduction section 6. Then, the user can search for images based on the user's subjective evaluation.

While two types of impression values (the first impression value and the second impression value) are used as the impression quantity in the first embodiment, it is not necessary to use two types of impression values. Only one of the first impression value and the second impression value may be used as the impression quantity, or an impression value having a different number of dimensions may be used. Where only one type of an impression value is used, the conversion function described above is not needed.

As described above, the music search device of the present invention includes the reference table containing pairs of the characteristic quantity and the impression quantity, and derives the mapping function by using the reference table, whereby the user does not have to previously evaluate a large number of tunes. The user can input the first impression value of a tune at any time to obtain a new mapping function based on the user's input. Thus, it is possible to realize a music search device which is capable of searching for a tune based on the user's subjective evaluation.

Second Embodiment

A music search device according to a second embodiment of the present invention will now be described. With the music search device of the second embodiment, it is easier for the user to make the adjustment input described above. The second embodiment uses an adjustment input screen which is different from that shown in FIG. 8. The second embodiment is similar to the first embodiment except for the adjustment input screen and the associated processes.

Figure 11:
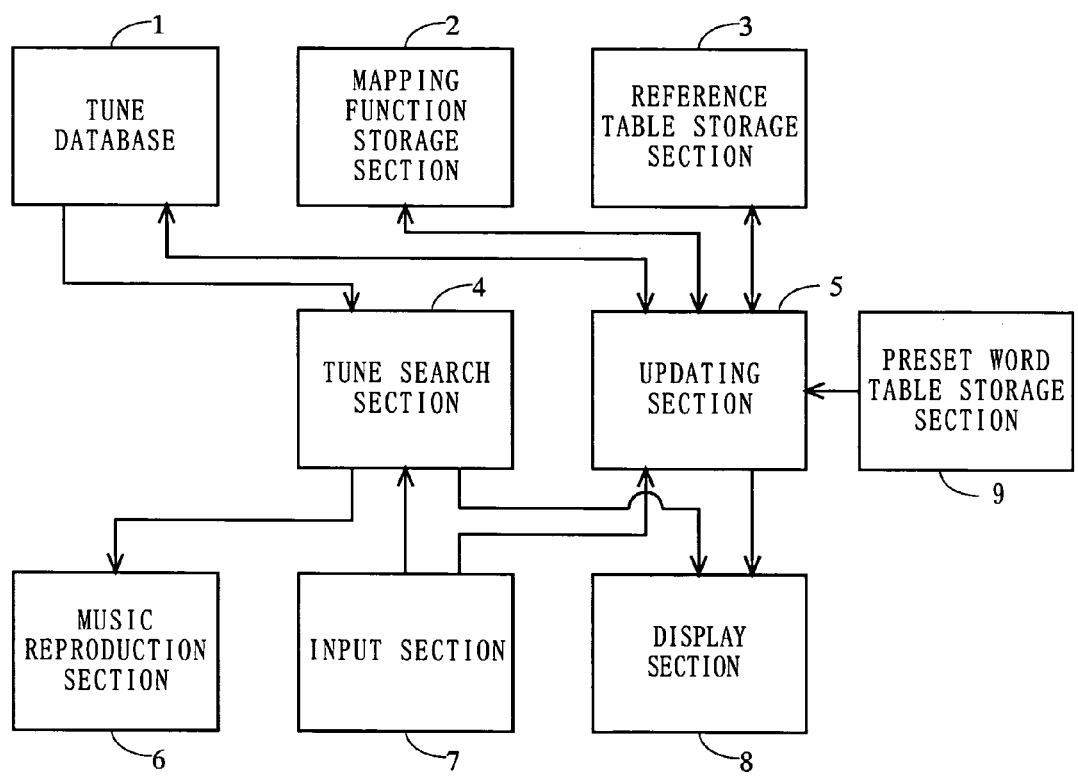
FIG. 11 is a block diagram illustrating a functional configuration of a music search device according to a second embodiment of the present invention.

FIG. 11 is a block diagram illustrating a functional configuration of the music search device of the second embodiment. Referring to FIG. 11, the music search device of the second embodiment is similar to that of FIG. 1 except for the provision of a preset word table storage section 9. The preset word table storage section 9 stores a preset word table. The preset word table is used by the updating section 5 in the process of displaying the adjustment input screen (corresponding to step S4 in FIG. 2).

Figures 12, 13:
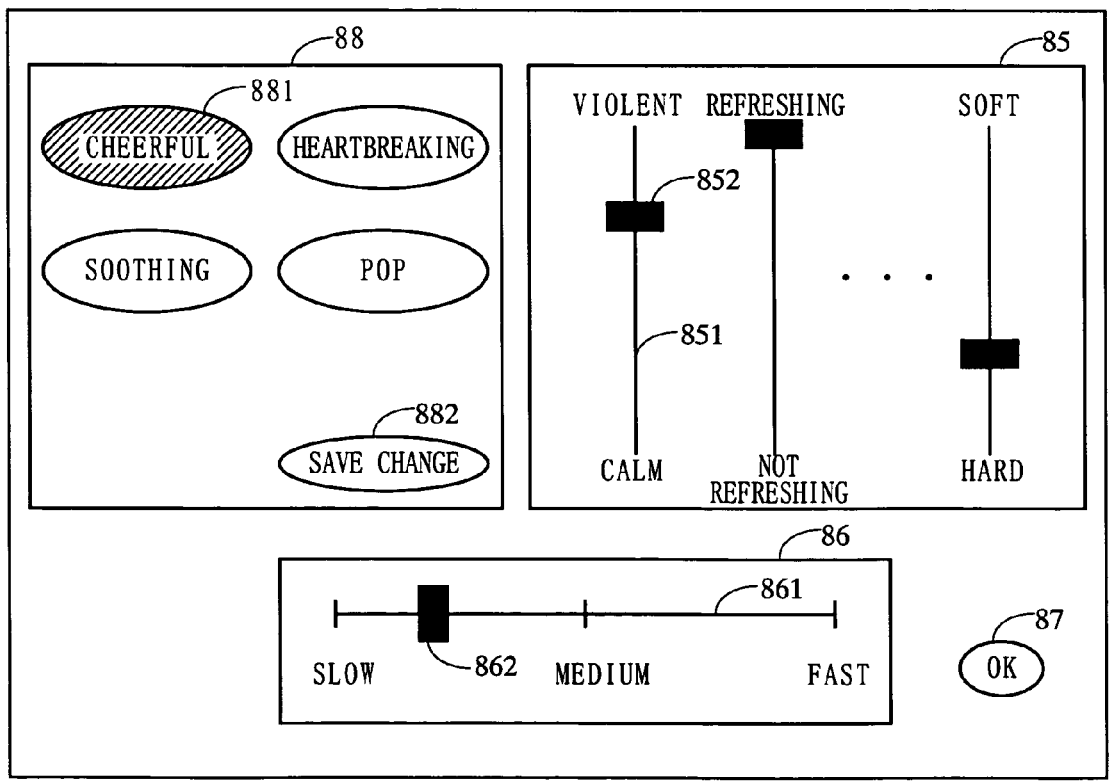
FIG. 12 shows an example of a preset word table used in the second embodiment.
FIG. 13 shows an example of an adjustment input screen of the second embodiment.

FIG. 12 shows an example of the preset word table used in the second embodiment. As shown in FIG. 12, the preset word table contains preset words and impression quantities (first impression values) associated therewith. A preset word as used herein is a word representing the listener's impression of a tune, such as "cheerful" and "heartbreaking". In FIG. 12, the preset word "cheerful" is associated with the first impression value where the violent-ness level is 5 and the refreshing-ness level is 7. While the first impression value is a five-dimensional vector value as in the first embodiment, only two characteristics (violent-ness and refreshing-ness) are shown in FIG. 12 for the sake of simplicity. A first impression value associated with a preset word in the preset word table will hereinafter be referred to as a preset word impression value. In the second embodiment, the user can make an adjustment input by using the preset words.

FIG. 13 shows an example of the adjustment input screen of the second embodiment. In the second embodiment, the adjustment input screen of FIG. 13 is displayed, instead of the adjustment input screen of FIG. 8, in the process of step S4 in FIG. 2. The adjustment input screen of FIG. 13 includes a preset word section 88, in addition to the first impression value adjustment section 85 and the tempo adjustment section 86.

Referring to FIG. 13, the preset word section 88 includes preset word selection buttons 881 captioned with the preset words contained in the preset word table. In the example shown in FIG. 13, the preset word selection buttons 881 are captioned "CHEERFUL", "HEARTBREAKING", "SOOTHING" and "POP". Before the user makes an adjustment input, one of the preset word selection buttons 881 associated with a preset word that is closest to the image of the tune being reproduced by the process of step S3 is highlighted. Specifically, when displaying the adjustment input screen, the updating section 5 retrieves the first impression value of the tune being reproduced from the tune database 1, and calculates the difference between the retrieved first impression value and each preset word impression value contained in the preset word table. Then, the updating section 5 selects one of the preset words contained in the preset word table that is associated with the preset word impression value closest to the retrieved first impression value. The preset words election button 881 associated with the selected preset word is highlighted in the adjustment input screen. In the example shown in FIG. 13, the preset word selection button 881 captioned "CHEERFUL" is being highlighted.

The first impression value adjustment section 85 and the tempo adjustment section 86 shown in FIG. 13 are similar to those shown in FIG. 8. Note however that before the user makes an adjustment input, the value adjustment tabs 852 are positioned in the first impression value adjustment section 85 so as to represent the preset word impression value associated with the preset word of the preset word selection button 881 being highlighted. In the example shown in FIG. 13, the value adjustment tabs 852 are positioned in the first impression value adjustment section 85 so as to represent the preset word impression value associated with the preset word "cheerful".

In the screen as shown in FIG. 13, the user selects a preset word that best describes the user's image of the tune being reproduced. The user can select a preset word by pressing the corresponding preset word selection button 881 using the input section 7. Then, the value adjustment tabs 852 are re-positioned in the first impression value adjustment section 85 so as to represent the preset word impression value of the preset word selected by the user. Then, the user presses the OK button 87 when the user believes that the selected preset word best describes the user's image of the tune being reproduced. In response to the activation of the OK button 87, the updating section 5 receives the preset word selected by the user via the input section 7. After receiving the preset word as an adjustment input, the updating section 5 converts the received preset word to the preset word impression value by using the preset word table. In the second embodiment, the updating section 5 uses the converted preset word impression value as a mapping function adjustment input. Then, in step S6, the updating process is performed by using the preset word impression value associated with the selected preset word as an adjustment input. As described above, in the second embodiment, the user can easily make an adjustment input by simply selecting a preset word that best describes the user's impression of the tune, without having to input a plurality of characteristics (5 characteristics) of the first impression value.

In the second embodiment, the contents of the preset word table can be changed by the user. Specifically, the user can adjust the preset word impression value for a preset word so that the preset word will be associated with tunes that better agree with the image of the preset word. The method of changing the contents of the preset word table will now be described in detail.

In the screen shown in FIG. 13, the user presses one of the preset word selection buttons 881 to select a preset word for which the user wishes to make an adjustment. Then, the value adjustment tabs 852 are re-positioned in the first impression value adjustment section 85 so as to represent the preset word impression value of the preset word selected by the user. Then, the user adjusts the first impression value (by moving the value adjustment tabs 852 in the first impression value adjustment section 85) so that it will better agree with the user's image of the selected preset word. After adjusting the first impression value, the user presses a save change button 882 in the preset word section 88. When the save change button 882 is pressed, the updating section 5 updates the preset word impression value of the selected preset word to the adjusted first impression value. Specifically, the updating section 5 updates the contents of the preset word table so that the selected preset word and the adjusted first impression value are associated with each other. Thus, each user can re-define the set of a preset word and the associated first impression value so that the first impression value will better agree with the user's image of the preset word.

In other embodiments, a preset word can be added to or removed from the preset word table. Thus, by adding a new preset word or removing an unnecessary preset word, the user can make an adjustment input that better reflects the user's image of a tune.

In the example shown in FIG. 13, the first impression value adjustment section 85 is always displayed in the adjustment input screen. In other embodiments, the first impression value adjustment section 85 does not have to be always displayed therein. For example, another button may be provided in the adjustment input screen so that the first impression value adjustment section 85 is displayed upon activation of the button.

The music search device described above can be used as, for example, an audio player, jukebox software, etc.

While the invention has been described in detail, the foregoing description is in all aspects illustrative and not restrictive. It is understood that numerous other modifications and variations can be devised without departing from the scope of the invention.

What is claimed is:

1. A music search device for searching for a tune using an impression quantity obtained by quantifying a listener's impression of such a tune, said device comprising:
   a tune data storage section for storing at least data of a plurality of tunes and a characteristic quantity for each tune obtained by quantifying characteristics of each tune;
   a reference table storage section for storing a reference table containing a previously obtained set of a characteristic quantity and an impression quantity for each of a plurality of sample tunes;
   an adjustment table storage section for storing an adjustment table containing a set of a characteristic quantity and an impression quantity for a tune stored in said tune data storage section;
   a mapping function storage section for storing a mapping function derived based on the reference table and the adjustment table;
   an adjustment receiving section for receiving an input from a user specifying an impression quantity for a tune stored in said tune data storage section as a mapping function adjustment input;
   an updating section for, when the mapping function adjustment input is received by said adjustment receiving section, adding to the adjustment table a set of a received impression quantity and a characteristic quantity of a tune associated with the received impression quantity, and updating the mapping function based on the adjustment table, to which the set of the impression quantity and the characteristic quantity has been added, and the reference table; and
   a search section for receiving an input from the user specifying an impression quantity as a tune data search instruction to search for tune data stored in said tune data storage section by using the received impression quantity and the mapping function updated by said updating section.

2. The music search device according to claim 1, wherein:
the impression quantity is represented as a first impression value, which is a multidimensional vector, or a second impression value, which is a lower-dimensional vector than the first impression value;
the mapping function is for converting a characteristic quantity to a second impression value;
the reference table and the adjustment table contain second impression values as impression quantities;
said adjustment receiving section is operable to receive an input specifying a first impression value as an impression quantity, and convert the received first impression value to a second impression value; and
said updating section is operable to add to the adjustment table a set of the second impression value converted by said adjustment receiving section and a characteristic quantity of a tune associated with the second impression value.

3. The music search device according to claim 2, wherein said search section includes:
a search data generation section for calculating a second impression value by using the mapping function updated by said updating section for each tune stored in said tune data storage section to generate search data in which each tune is associated with the calculated second impression value; and
a second impression value receiving section for receiving an input specifying a second impression value as an impression quantity to search for a tune by using the received second impression value and the search data.

4. The music search device according to claim 2, wherein said search section includes:
a search data generation section for calculating a second impression value by using the mapping function updated by said updating section for each tune stored in said tune data storage sections and converting the calculated second impression value to a first impression value to generate search data in which each tune is associated with the converted first impression value; and
a first impression value receiving section for receiving an input specifying a first impression value as an impression quantity to search for a tune by using the received first impression value and the search data.

5. The music search device according to claim 1, wherein the reference table further contains a tune weight in addition to a characteristic quantity and an impression quantity associated with each of a plurality of sample tunes, and
wherein said updating section includes:
an impression quantity updating section for, when the mapping function adjustment input is received by said adjustment receiving section, adding to the adjustment table a set of a received impression quantity, a predetermined tune weight value, and a characteristic quantity of a tune associated with the received impression quantity;
a mapping function updating section for updating the mapping function based on the adjustment table, to which the set of the impression quantity and the characteristic quantity has been added by said impression quantity updating section, and the reference table; and
a tune weight updating section for updating the tune weight contained in the reference table.

6. The music search device according to claim 1, wherein said reference table storage section is operable to store a plurality of types of reference tables as pieces of evaluation data, with a data weight being associated with each piece of the evaluation data, and
wherein said updating section includes:
an impression quantity updating section for, when the mapping function adjustment input is received by said adjustment receiving section, deriving a single reference table based on the pieces of the evaluation data and the data weight, and adding to the single reference table a set of a received impression quantity and a characteristic quantity of a tune associated with the received impression quantity;
a mapping function updating section for updating the mapping function based on the adjustment table, to which the set of the impression quantity and the characteristic quantity has been added by said impression quantity updating section, and the reference table; and
a data weight updating section for updating the data weight stored in said reference table storage section.

7. The music search device according to claim 1, further comprising:
a selection input receiving section for receiving a selection input specifying one of the tunes stored in said tune data storage section; and
a reproduction section for, when a selection input is received by said selection input receiving section, reproducing the tune specified by the selection input,
wherein said adjustment receiving section is operable to receive an input from the user specifying an impression quantity for the tune being reproduced by said reproduction section.

8. The music search device according to claim 7, further comprising an impression quantity presentation section for, when a selection input is received by said selection input receiving section, presenting to the user an impression quantity that is obtained, by using the mapping function, from a characteristic quantity stored in said tune data storage section for the tune specified by the selection input.

9. The music search device according to claim 8, further comprising:
a preset word table storage section for storing a preset word table in which a plurality of preset words, each representing a listener's impression of a tune, are each associated with an impression quantity of the tune; and
a preset word presentation section for, when a selection input is received by said selection input receiving section, presenting to the user one of the preset words contained in the preset word table that is associated with an impression quantity closest to the impression quantity presented by said impression quantity presentation section.

10. The music search device according to claim 9, further comprising:
a preset word display section for displaying at least one preset word stored in the preset word table;
a preset word receiving section for receiving an input from the user specifying one of the at least one preset word displayed by said preset word display section; and
an impression quantity conversion section for converting the preset word received by said preset word receiving section to an impression quantity by using the preset word table, wherein said adjustment receiving section is operable to receive the impression quantity converted by said impression quantity conversion section as the mapping function adjustment input.

11. The music search device according to claim 10, wherein the impression quantity values contained in the preset word table can be adjusted by the user.

12. The music search device according to claim 1, wherein the characteristic quantity stored in said tune data storage section includes a value representing a tempo of a tune, and
wherein said music search device further comprises:
a tempo input receiving section for receiving an input from the user specifying a tempo value for a tune stored in said tune data storage section; and
a tempo updating section for updating the tempo value stored in said tune data storage section based on the tempo value received by said tempo input receiving section.

13. The music search device according to claim 12, wherein the tempo updating section is operable to use, as an adjusted tempo value, either the tempo value as stored in said tune data storage section before the adjustment, a value twice the stored tempo value or a value half the stored tempo value, whichever is closest to the tempo value received by said tempo input receiving section.

14. A music search method for searching for a tune using an impression quantity obtained by quantifying a listener's impression of such a tune, said method comprising:
storing at least data of a plurality of tunes and a characteristic quantity obtained by quantifying characteristics of each tune;
preparing a reference table containing a previously obtained set of a characteristic quantity and an impression quantity for each of a plurality of sample tunes, and an adjustment table for containing a set of a characteristic quantity and an impression quantity for each stored tune;
storing a mapping function derived based on the reference table and the adjustment table;
receiving an input from a user specifying an impression quantity for a stored tune as a mapping function adjustment input;
adding, when the mapping function adjustment input is received, to the adjustment table a set of a received impression quantity and a characteristic quantity of a tune associated with the received impression quantity, and updating the mapping function based on the adjustment table, to which the set of the impression quantity and the characteristic quantity has been added, and the reference table;
calculating an impression quantity for each of the stored tunes by using the updated mapping function to generate search data in which each tune is associated with the calculated impression quantity; and
receiving an input from the user specifying an impression quantity as a tune data search instruction to search for the stored tune data by using the received impression quantity and the updated mapping function.

15. A program being executable by a computer recorded on a computer-readable medium, for instructing a computer to perform a music search for searching for a tune using an impression quantity obtained by quantifying a listener's impression of such a tune, said program causing the computer to:

store at least data of a plurality of tunes and a characteristic quantity for each tune obtained by quantifying characteristics of each tune;
store a reference table containing a previously obtained set of a characteristic quantity and an impression quantity for each of a plurality of sample tunes;
store an adjustment table containing a set of a characteristic quantity and an impression quantity for a stored tune;
store a mapping function derived based on the reference table and the adjustment table;
receive an input from a user specifying an impression quantity for a stored tune as a mapping function adjustment input;
add, when the mapping function adjustment input is received in the adjustment receiving step, to the adjustment table a set of a received impression quantity and a characteristic quantity of a tune associated with the received impression quantity, and updating the mapping function based on the adjustment table, to which the set of the impression quantity and the characteristic quantity has been added, and the reference table; and
receive an input from the user specifying an impression quantity as a tune data search instruction to search for the stored tune data by using the received impression quantity and the undated mapping function.

16. A computer-readable storage medium storing a program being executable by a computer for instructing a computer to perform a music search for searching for a tune using an impression quantity obtained by quantifying a listener's impression of such a tune, said program causing the computer to perform operations comprising:
storing at least data of a plurality of tunes and a characteristic quantity for each tune obtained by quantifying characteristics of each tune;
storing a reference table containing a previously obtained set of a characteristic quantity and an impression quantity for each of a plurality of sample tunes;
storing an adjustment table containing a set of a characteristic quantity and an impression quantity for a tune stored in said storing of at least the data of a plurality of tunes and the characteristic quantity for each tune;
storing a mapping function derived based on the reference table and the adjustment table;
receiving an input from a user specifying an impression quantity for a tune stored in said storing of at least the data of a plurality of tunes and the characteristic quantity for each tune as a mapping function adjustment input;
adding, when the mapping function adjustment input is received, to the adjustment table a set of a received impression quantity and a characteristic quantity of a tune associated with the received impression quantity, and updating the mapping function based on the adjustment table, to which the set of the impression quantity and the characteristic quantity has been added, and the reference table; and
receiving an input from the user specifying an impression quantity as a tune data search instruction to search for tune data stored in said storing of at least the data of a plurality of tunes and the characteristic quantity for each tune by using the received impression quantity and the updated mapping function.

* * * * *

UNITED STATES PATENT AND TRADEMARK OFFICE
CERTIFICATE OF CORRECTION

PATENT NO. : 7,231,389 B2  Page 1 of 1
APPLICATION NO. : 10/852617
DATED : June 12, 2007
INVENTOR(S) : Hiroaki Yamane et al.

It is certified that error appears in the above-identified patent and that said Letters Patent is hereby corrected as shown below:

IN THE CLAIMS

In column 21, claim 4, line 40, please replace "sections and" with --section, and--.

In column 23, claim 15, line 60, "A program being executable by a computer recorded" should read --A program, recorded--.

Signed and Sealed this

Fourth Day of December, 2007

JON W. DUDAS
*Director of the United States Patent and Trademark Office*